United States Patent
Ito et al.

[11] Patent Number: 6,001,457
[45] Date of Patent: Dec. 14, 1999

[54] CASING AND METHOD FOR MANUFACTURING THE LIKE

[75] Inventors: Masahiro Ito; Kenji Ogura; Tadashi Shimizu; Chiharu Kamiya; Yoshihide Kanai, all of Kariya, Japan

[73] Assignees: Denso Corporation; Shimizu Industry Co., Ltd., both of Kariya, Japan

[21] Appl. No.: 08/963,088

[22] Filed: Nov. 3, 1997

[30] Foreign Application Priority Data

Nov. 15, 1996 [JP] Japan ..................... 8-305078

[51] Int. Cl.[6] ..................... B32B 3/00; B29B 7/00
[52] U.S. Cl. .................... 428/172; 428/122; 428/192; 428/215; 156/242; 156/245; 156/250; 264/241; 264/328.1
[58] Field of Search ..................... 428/156, 172, 428/192, 122, 212, 213; 156/244.15, 245, 242, 250; 264/241, 297.2, 328.1, 249

[56] References Cited

U.S. PATENT DOCUMENTS

| 2,741,572 | 4/1956 | Lennartz | 428/122 |
| 4,342,810 | 8/1982 | Adcock | 428/215 |
| 4,957,796 | 9/1990 | Pelzer | 428/122 |

FOREIGN PATENT DOCUMENTS

| 0 492 052 A2 | 7/1992 | European Pat. Off. |
| 37 13710 A1 | 11/1987 | Germany . |
| A-3-256726 | 11/1991 | Japan . |
| 1468817 | 3/1977 | United Kingdom . |
| 1502266 | 3/1978 | United Kingdom . |
| 2151757 | 7/1995 | United Kingdom . |

OTHER PUBLICATIONS

Patent Abstracts of Japan, M–154, Sep. 7, 1982, vol. 6, No. 172, Japanese Patent No. 57–83441 (A).

*Primary Examiner*—Donald Loney
*Attorney, Agent, or Firm*—Harness, Dickey & Pierce, PLC

[57] ABSTRACT

According to the present invention, in a casing having a casing member made of resin and a porous elastic member affixed onto the casing member, there is formed a thick wall portion, which is thicker than the other portions, at a bending corner portion formed between wall surfaces of the casing member. In this way, when the resinous casing member is molded, the resin in a melted state flows along a surface at an opposite side of the elastic member (at a side of an affixing surface between the casing member and the insulator), in a space for forming the thick wall portion. Therefore, the resin in the melted state is prevented from flowing to press upward an end portion of the elastic member at the corner portion. Accordingly, the defective "reversing" is prevented so that the elastic member can be affixed on the wall surface of the casing member satisfactorily.

8 Claims, 5 Drawing Sheets

CASING AND METHOD FOR MANUFACTURING THE LIKE

CROSS-REFERENCE TO RELATED APPLICATION

This application is based on and claims priority of Japanese Patent Application of No. Hei. 8-305078 filed on Nov. 15, 1996, the contents of which are incorporated herein by reference.

BACKGROUND OF THE INVENTION

1. Field of the Invention

This invention relates to a casing having a bending wall surface (corner portion) provided with a porous elastic member (insulator) for absorbing noise and insulating heat on an inner wall thereof, and is effectively employed for an air conditioning case of an air conditioning apparatus for a vehicle, for example.

2. Description of Related Art

Conventionally, an insulator is disposed on an inner wall of a casing, as described below.

That is, a plane insulator sheet is formed along a shape of a concave portion by a vacuum forming method (refer to JP-A-3-256726), and then a worker manually cuts and removes (trims) unnecessary portions of an outer edge of the insulator. After the worker paints an adhesive on an inner wall of the casing, and the trimmed insulator is manually affixed onto the inner wall of the casing.

When the insulator is affixed onto the inner wall of the casing, if a work for pressing (contacting closely) a whole surface of the insulator onto the inner surface is insufficient, there occurs a defective adhesion such as a void space or peeling of the insulator. Therefore, as described above, if the insulator is manually affixed onto the inner wall, because a defective adhesion due to an insufficient pressing work may be caused, a yield of the casing may deteriorate, and a manufacturing cost of the casing may be increased.

To eliminate the insufficient pressing work, the inventors of the present invention have tried a method for fixing the insulator when the resinous casing is molded, as disclosed in U.S. Pat. No. 4,994,226. As a result, as shown in FIG. 9C, there has been discovered a defective "reversing" in which at a corner portion an insulator 20 is exposed to a side of an outer wall of a casing 10. In FIG. 9C, the numerals 100 and 101 are dies for molding a resinous casing.

SUMMARY OF THE INVENTION

In view of the above-described problem, an object of the present invention is to affix an insulator onto an inner wall of the casing by preventing the defective "reversing".

According to a first aspect of the present invention, in a casing having a casing member made of resin and a porous elastic member affixed onto the casing member, there is formed a thick wall portion, which is thicker than the other portions, at a bending corner portion formed between wall surfaces of the casing members. In this way, when the resinous casing member is molded, the resin in a melted state flows along a surface at an opposite side of the elastic member (at a side of an affixing surface between the casing member and the insulator), in a space for forming the thick wall portion. Therefore, the resin in the melted state is prevented from flowing while pressing upward an end portion of the elastic member at the corner portion. Accordingly, the defective "reversing" is prevented so that the elastic member can be affixed on the inner wall surface of the casing member satisfactorily.

According to a second aspect of the present invention, in a method for manufacturing a casing including a casing member made of resin and having wall surfaces in which a bending corner portion is formed therebetween, by using molding dies, a plate porous elastic member is cut into a predetermined shape, the porous elastic member is disposed at a predetermined position in a space formed by the molding dies. Then, resin is injected into the space to mold the casing member in such a manner that a thick wall portion which is thicker than the other portion of the wall surfaces is formed at the corner portion, and simultaneously the porous elastic member is onto the wall surfaces.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Figure 1A:
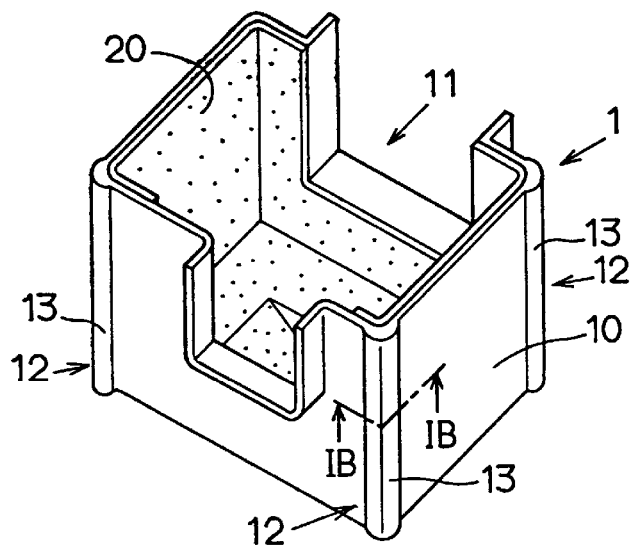
FIG. 1A is a perspective view of a resinous casing.

Referring to the drawings, preferred embodiments of the present invention will be described.

A first embodiment of the present invention will be described.

FIG. 1 is a perspective view of a resinous casing 1 according to the embodiment, and the resinous casing 1 is employed for an air conditioning casing for forming an air passage of an air conditioning apparatus for a vehicle, for example. The resinous casing 1 has a depressed concave portion 11, and includes a casing 10 made of resin which is superior in formability, such as polypropylene, and an insulator (porous elastic member) 20 affixed onto an inner wall of the concave portion 11 of the casing 10.

In a bending wall surface (hereinafter referred to as corner portion) which draws a circle, of the wall surface of the casing, there is formed, at the corner portion 12 a fitting surface 20a (see FIG. 5A) in which end portions of the insulator 20 connect and fit to each other, a thick wall portion 13 protruding in a direction at a side of an affixing surface where the insulator 20 and the casing 10 are affixed, i.e., outwardly of the corner portion 12 and having a thicker thickness than the other portions.

In a portion where the insulator 20 is affixed, there is provided a heat exchanger (not shown) such as an evaporator and a heater core, and a heat insulation between an outside and an inside of the resinous casing 1 is performed by the insulator 20.

Next, a method for manufacturing the resinous casing 1 will be described.

First, a plate material (polyethylene in this embodiment) for the insulator 20 is cut (as a first process) by the Thomson process into a shape (see FIG. 2A) where the concave portion 11 is exposed. An upper die and a lower die are closed (as a second process) in such a manner that the cut insulator 20 is disposed in a predetermined position of a die space 103 (see FIG. 5A), which is formed by both dies 100 and 101 and constructs the wall surface of the casing 10, to adapt the insulator 20 to the shape of the die space. The adaption of the insulator 20 to the die space 103 is performed as follows.

Figure 3A:
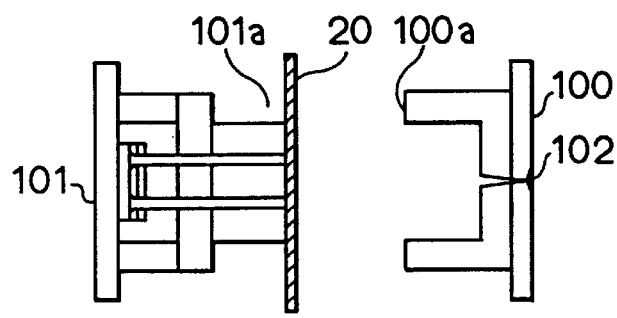
FIG. 3A and FIG. 3B are schematic views showing a part of the second process.
Figure 3B:
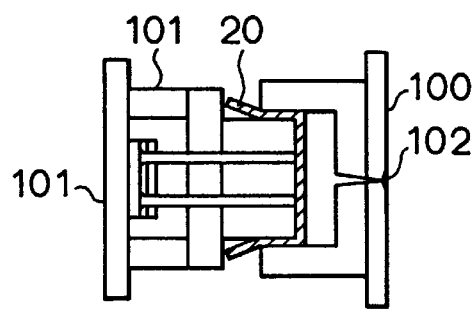
Figure 4A:
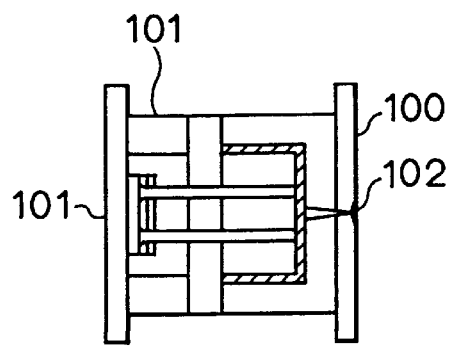
FIG. 4A is a schematic view showing a part of a third process.
Figure 4B:
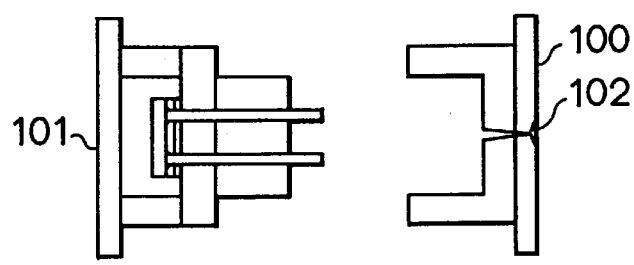
FIG. 4B is a schematic view showing a part of a fourth process.

That is, an apparatus for closing dies closes both dies 100 and 101 with approximately 80% speed of a capacity thereof until an end portion 100a (see FIG. 3) on the side of the lower die 101, of the upper die 100, reaches an end portion 101a (see FIG. 3) on the side of the upper die 100, of the lower die 101. Further, until the end portion 100a reaches a position shifted from the end portion 101a with a distance being equal to approximately 10% of a protrusion height of the lower die 101, the apparatus closes both dies 100 and 101 with approximately 50% speed of the capacity (80% speed is suddenly decreased to 50% speed). Subsequently, 50% speed is increased to approximately 80% speed again, and the process (second process) for closing dies is completed.

Next, resin (polypropylene in this embodiment) in a melted state is injected from an injection port (gate) 102 formed in the upper die 100, so that the thick wall portion 13 is formed at the corner portion 12 and the casing 10 is formed by the injected resin.

Simultaneously, the resin in the melted state enters a large number of holes formed in the insulator 20, and the resin becomes like an anchor, so that the insulator 20 is mechanically affixed onto the casing (hereinafter referred to as anchor effect) (as a third process).

Subsequently, the resinous casing having been formed is taken out from both dies 100 and 101 (as a fourth process), and a size of each portion, an existence of "shrinkage" or "cavity", and an existence of a defective adhesion between the insulator 20 and the casing 10 and the like, are checked (as a fifth process).

The Thomson process is a method in which a cutting edged tool (Thomson edge) is disposed in a base, an insulator is put on the Thomson edge, and the insulator is cut into a predetermined shape by pressing.

Figure 2A:
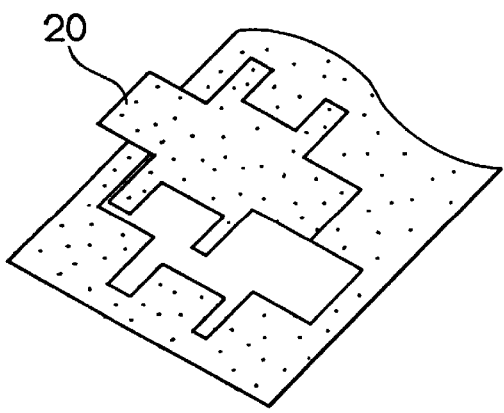
FIG. 2A is a schematic view showing a first process.
Figure 2B:
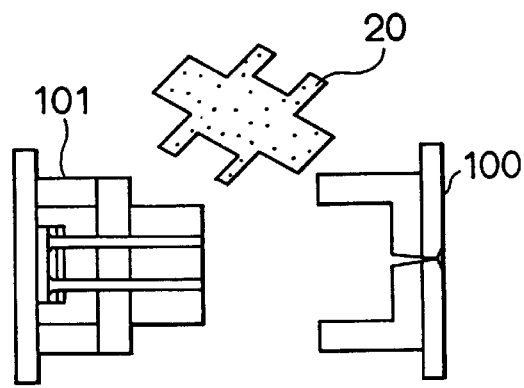
FIG. 2B is schematic view showing a part of the second process.

FIGS. 2A to 4 schematically show the above-described manufacturing processes. FIG. 2A shows the first process, FIG. 2B and FIGS. 3A and 3B show the second process, FIG. 4A shows the third process, and FIG. 4B shows the fourth process.

Next, features of the present invention will be described.

Figure 1B:
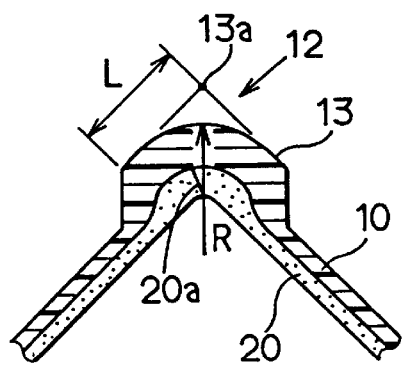
FIG. 1B is a cross sectional view taken along line IB—IB of FIG. 1A.
Figure 5A:
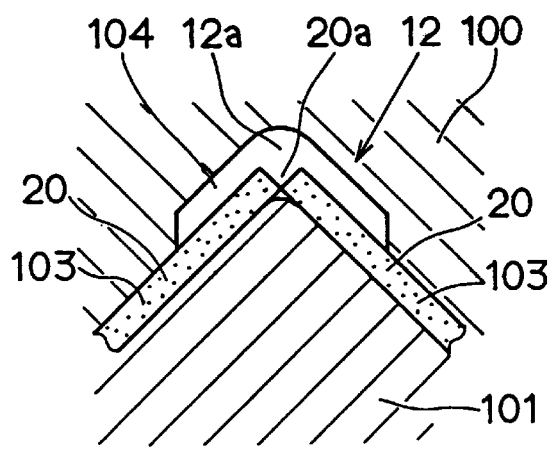
FIG. 5A, FIG. 5B, FIG. 5C, and FIG. 5D are schematic views showing a flowing state of the resin in the third process.
Figure 5B:
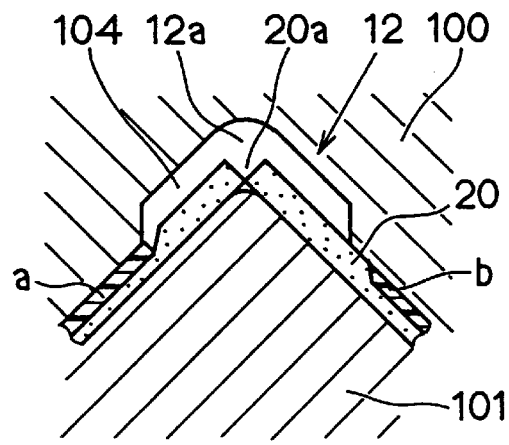
Figure 5C:
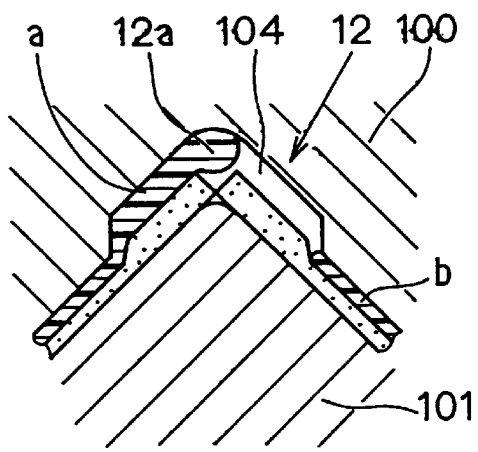
Figure 5D:
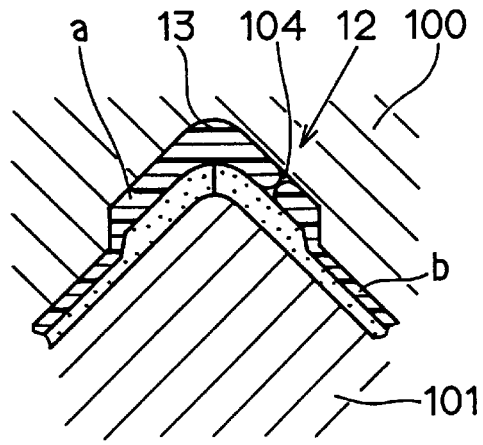

FIG. 5A shows the corner portion 12 after the second process, FIGS. 5B to 5D schematically shows a flow of the resin in the corner portion 12 (the portion corresponding to the cross section taken along the IB—IB line of FIG. 1A).

As being apparent from FIG. 5A, in the process (second process) before the resin is injected, the space for disposing the insulator 20, of the die space 103, is substantially fully occupied with the insulator 20. On the other hand, at the corner portion 12 for forming the fitting surface 20a, there is formed a die space 104 for forming a thick wall portion (hereinafter referred to as thick wall space). When the resin in the melted state is injected from the injection port 102, the resin in the melted state flows, as shown in FIG. 5B, from both sides of the corner portion 12 toward a top portion 12a of the corner portion 12.

Here, to simplify the following explanation, the resin flowing from the left side toward the top portion 12a on the sheet is referred to as the resin "a", and the resin flowing from the right side toward the top portion 12a on the sheet is referred to as the resin "b".

At this time, when the resin "a" reaches the top portion 12a earlier than the resin "b" because the flowing speed of the resin "a" is higher than that of the resin "b", or when the resin "a" reaches the top portion 12a earlier than the resin "b" because of the positional relationship between the injection port 102 and the corner portion 12, the resin "a" flows, as shown in FIG. 5C, outwardly of the concave portion 11, i.e., along the wall surface at an outer side of the thick wall space 104.

Therefore, the resin "a" flows, as shown in FIG. 5D, toward the resin "b" while being filled in the thick wall space 104, and finally, the resin "a" and the resin "b" join, so that the corner portion 12 is integrated as a whole.

As described above, according to this embodiment, the resin "a" flows in the thick wall space 104 along the wall surface at an opposite side of the insulator 20, i.e., along the wall surface at the outer side of the thick wall space 104. Therefore, by preventing the defective "reversing", it is possible to affix the insulator 20 onto the inner wall of the casing 10.

Further, according to this embodiment, because the defective "reversing" is prevented by forming the thick wall portion 13 (thick wall space 104), a wall thickness of the thick wall portion 13 (thick wall space 104) has a significant meaning to prevent the defective "reversing". As a result of various examinations and studies by the inventors, it comes to the conclusion that the wall thickness of the thick wall portion 13 needs to be at least 1.5 times as thick as that of the other portions.

Even if the wall thickness or the size of the thick wall portion 13 is increased at random, the shapes of both dies 100 and 101 become complicated, with the result that the cost for the dies and the cost for the resinous material increase simply. According to the studies of the inventors, it comes to the conclusion that, practically, the wall thickness of the thick wall portion 13 is approximately 1.2–2 times (preferably, approximately 1.5–2 times) as thick as that of the other portions, and it is preferable that a length L of the thick wall portion 13 is approximately equal to an outer radius R of the corner portion 12 with a top portion 13a (see FIG. 1B) at the side of the outer wall, of the corner portion 12, as a center thereof, in such a manner that at least the thick wall portion 13 is formed in an area substantially equal to the outer radius R of the corner portion 12.

Further, because there needs no process for forming the plane insulator sheet 20 into the shape along the concave portion 11 by a vacuum forming method and no process for cutting the unnecessary portions of the outer edge portion of the insulator 20, the manufacturing cost of the resinous casing 1 can be reduced.

A second embodiment of the present invention will be described.

In the first embodiment, the insulator 20 and the casing 10 are mechanically affixed by the anchor effect only; however, in this embodiment, in addition to the anchor effect, the casing 10 and the insulator 20 are connected chemically.

In this embodiment, the material of the insulator 20 is polypropylene, which is the same material as the casing 10. In this way, when the resin in the melted state is injected in the third process, the resin enters into the holes of the insulator 20, and simultaneously the resin and the insulator 20 are connected chemically (molecular-structurally).

In this way, because the chemical connection force is added in addition to the mechanical connection force by the anchor effect, the insulator 20 and the casing 10 can be affixed more rigidly.

Further, because the insulator 20 and the casing 10 are made of the same resinous material, when the resinous casing 1 is re-cycled, it is not necessary to separate the insulator 20 from the casing 10, and the re-cycling performance of the resinous casing 1 improves.

The insulator 20 and the casing 10 are made of the same resinous material, and both have the same melting points. If the injection pressure (a flowing speed of the resin in the melted state) is excessively high, a thermal depression of the insulator 20 may be caused. Therefore, it is necessary to decrease the injection pressure to the extent that the thermal depression of the insulator 20 is not caused.

The present invention has been conceived in view of the generation of the defective "reversing" due to the unbalance of the flowing state of the resin "a" and "b" at the corner portion 12. Therefore, as shown in FIG. 6, if there is provided a resin guiding portion (flow leader) 14 for introducing the resin in the melted state from the portion 102a corresponding to the injection port 102 to the other portions, of the wall surface of the casing 10 in such a manner that the flowing state of the resin "a" and "b" are balanced with each other, the defective "reversing" can be further prevented.

Figure 6A:
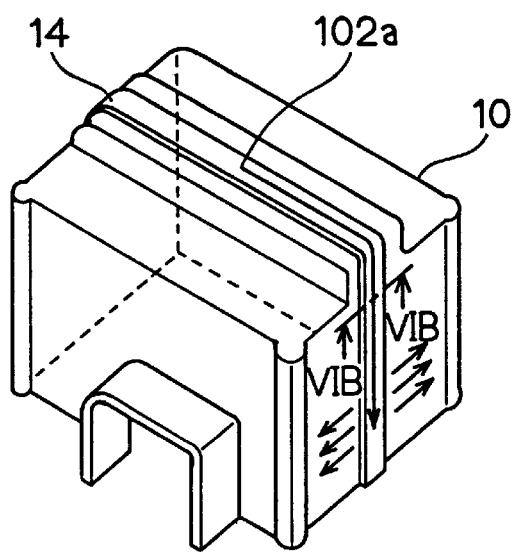
FIG. 6A is a perspective view of a resinous casing when a flow leader is provided.
Figure 6B:
FIG. 6B is a cross sectional view taken along line VIB—VIB of FIG. 6A.

That is, as shown by arrows in FIG. 6, first, the resin flows into the flow leader 14, and then the resin flows toward end portions, like branches spread from the flow leader 14. Therefore, the resin flowing over the entire casing 10 can be controlled easier.

The resin guiding portion (flow leader) 14 is, as being known well, for improving the flowing performance of the resin by increasing the wall thickness to positively accelerate the resin flowing into the flow leader 14 as a trunk.

Figure 7:
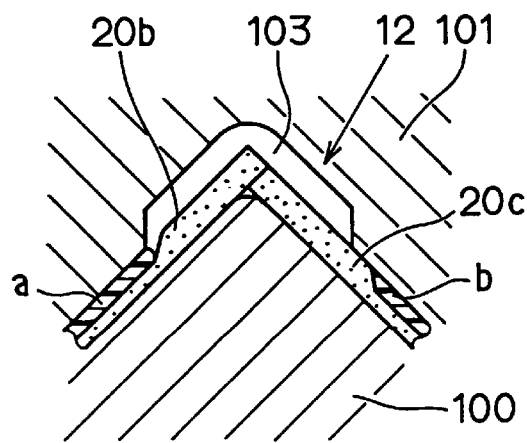
FIG. 7 is an explanatory view showing a modification of the present invention.
Figure 9A:
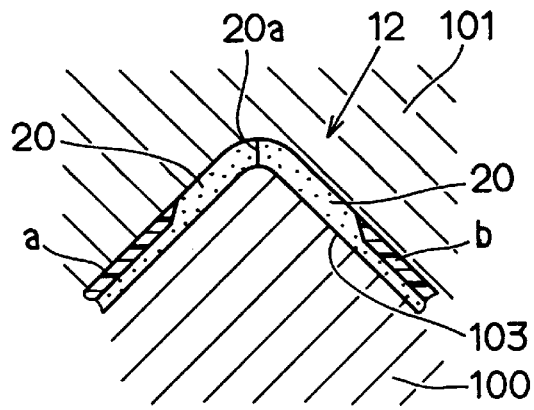
FIG. 9A, FIG. 9B, and FIG. 9C are explanatory for explaining a cause of a generation of a defective "reversing"
Figure 9B:
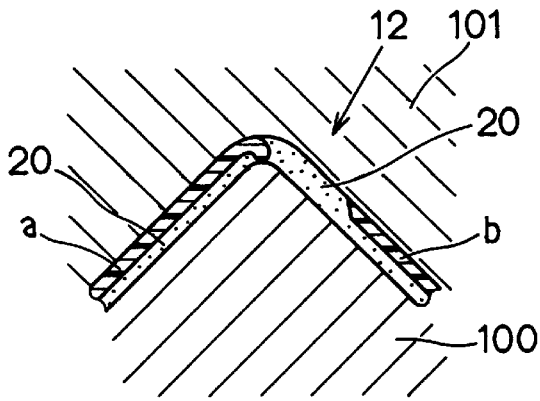
Figure 9C:
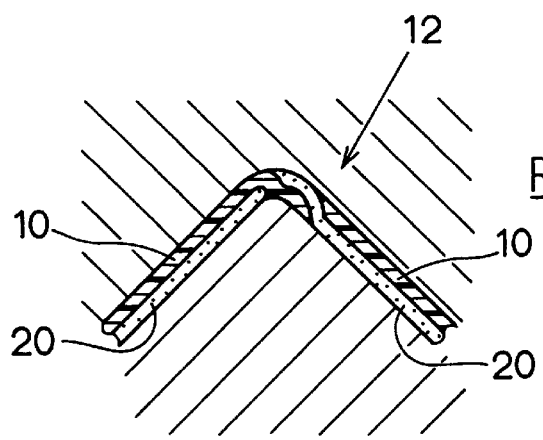
Figure 10:
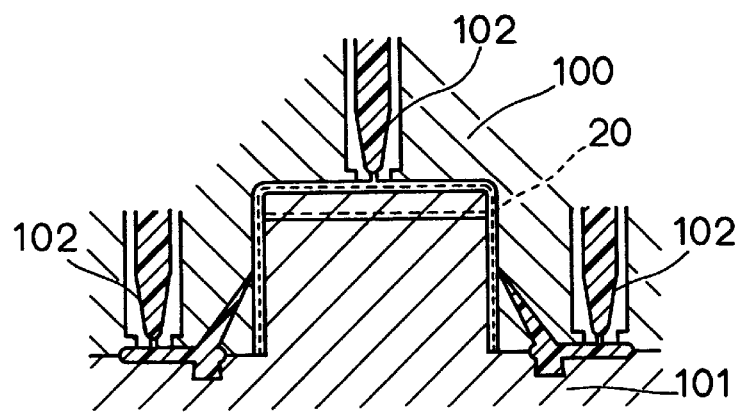
FIG. 10 is a schematic view showing a state where dies are closed when the number of the injection ports is increased.

When the resin "a" flows at the corner portion 12, the defective "reversing" is caused by pushing the fitting surface 20a of the insulator 20 upward, as shown in FIG. 9A. Therefore, as shown in FIG. 7, if the insulator 20b of the resin "a" is covered with an end portion of the insulator 20c of the resin "b", the defective "reversing" can be further certainly prevented.

In the above-described embodiment, the insulator 20 is affixed onto the inner wall surface of the casing 10; however, the present invention is not limited thereto but may be employed for a resinous casing in which the insulator 20 is affixed onto an outer wall surface of the casing 10.

Figure 8:
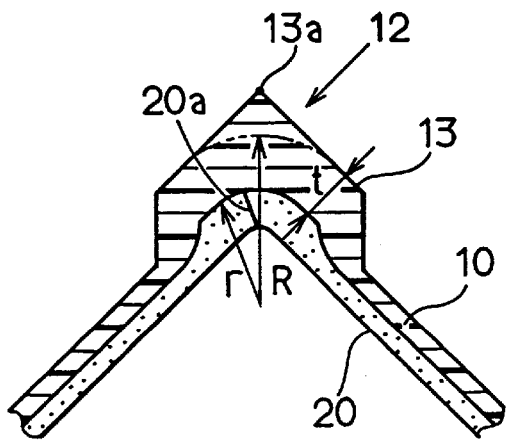
FIG. 8 is an explanatory view showing another modification of the present invention.

In the above-described embodiment, the corner portion 12 is formed such that each of the inner and outer shapes draws a circular shape; however, as shown in FIG. 8, the outer shape may be formed in a rectangle. In this case, the outer radius R (shown by the two-dot chain line) may be a value which is a sum of the inner radius r and the wall thickness t of the thick wall portion 13.

Further, the present invention can be employed not only for the resinous casing having the depressed concave portion 11 but also for a resinous casing having a simple shape composed of only a bending corner portion formed in a L-shape, a U-shape, or the like.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A casing comprising:

a casing member made of resin and having wall surfaces in which a bending corner portion is formed therebetween; and a porous elastic member disposed on said wall surfaces, said porous elastic member being affixed onto said wall surfaces when said casing member is formed, said porous elastic member including a pair of end portions having a fitting surface between them at said bending corner portion;

wherein said casing member has a thick wall portion at said corner portion, which is thicker than the other portions thereof.

2. A casing according to claim 1, wherein, said end portions are connected to each other when said casing member is formed.

3. A casing according to claim 1, wherein a thickness of said thick wall portion is at least 1.2 times as thick as that of the other portions.

4. A casing according to claim 1, wherein, said corner portion has a bending inner surface which draws a circle, and at least said thick wall portion is formed in an area substantially equal to an outer radius R of said corner portion with a top point at a side of an outer wall of said corner portion as a center.

5. A casing according to claim 1, wherein said casing member and said porous elastic member are made of resin material which are chemically connected to each other.

6. A casing according to claim 1, wherein said casing member has a concave opening portion in said wall surface.

7. A casing comprising:

a casing member made of resin and formed in a box-shape having an opening face, said casing member having walls in which a bending corner portion is formed therebetween; and a porous elastic member disposed on inner surfaces of said walls, said porous elastic member being affixed onto said inner surfaces when said casing member is formed, said porous elastic member including a pair of end portions having a fitting surface between them at said bending corner portion;

wherein said casing member has a thick wall portion at said corner portion, which is thicker than a thickness of said wall.

8. A method for manufacturing a casing including a casing member made of resin and having wall surfaces in which a bending corner portion is formed therebetween, by using molding dies, said method comprising:

cutting a plate porous elastic member into a predetermined shape;

disposing said porous elastic member at a predetermined position in a space formed by said molding dies, said porous elastic member having a pair of end portions having a fitting surface between them at the bending corner portion; and injecting resin into said space to mold said casing member in such a manner that a thick wall portion which is thicker than the other portion of said wall surfaces is formed at said corner portion, and simultaneously affixing said porous elastic member onto said wall surfaces.

* * * * *